US011354151B2

(12) United States Patent
Patil et al.

(10) Patent No.: US 11,354,151 B2
(45) Date of Patent: Jun. 7, 2022

(54) HARDWARE MEMORY ENCRYPTION AND PROTECTION FOR CONTAINERS

(71) Applicant: International Business Machines Corporation, Armonk, NY (US)

(72) Inventors: Harshal Patil, Bangalore (IN); Pradipta Banerjee, Bangalore (IN); Nitesh Konkar, Bangalore (IN); Manjunath Kumatagi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 16/788,677

(22) Filed: Feb. 12, 2020

(65) Prior Publication Data
US 2021/0247994 A1    Aug. 12, 2021

(51) Int. Cl.
*H04L 9/40* (2022.01)
*G06F 9/455* (2018.01)
*H04L 9/14* (2006.01)
*G06F 9/445* (2018.01)

(52) U.S. Cl.
CPC ...... *G06F 9/45558* (2013.01); *G06F 9/44505* (2013.01); *H04L 9/14* (2013.01); *H04L 63/0428* (2013.01); *G06F 2009/45587* (2013.01)

(58) Field of Classification Search
CPC ............. G06F 9/45558; G06F 9/44505; G06F 2009/45587; H04L 9/14; H04L 63/0428
USPC ......................................................... 713/164
See application file for complete search history.

(56) References Cited

U.S. PATENT DOCUMENTS

| | | | |
|---|---|---|---|
| 9,710,401 B2 | 7/2017 | Rozas | |
| 9,792,427 B2 | 10/2017 | Costa | |
| 10,250,522 B1 | 4/2019 | Anderson | |
| 2017/0147361 A1* | 5/2017 | Kirvan | G06F 9/44505 |
| 2019/0044927 A1* | 2/2019 | Sood | G06F 21/6209 |
| 2019/0158537 A1 | 5/2019 | Miriyala | |
| 2020/0403784 A1* | 12/2020 | Rodriguez | G06F 21/74 |
| 2021/0135871 A1* | 5/2021 | Banerjee | G06F 21/57 |

OTHER PUBLICATIONS

Arnautov et al., "SCONE: Secure Linux Containers with Intel SGX", This paper is included in the Proceedings of the 12th USENIX Symposium on Operating Systems Design and Implementation (OSDI '16), Nov. 2-4, 2016 • Savannah, GA, USA, 17 pages, <https://www.usenix.org/conference/osdi16/technical-sessions/presentation/arnautov>.
Banerjee et al., "What You Define is What You Deploy", Jan. 27, 2020, 3 pages, 'Grace Period Disclosure', <https://medium.com/@pradipta.banerjee/what-you-define-is-what-you-deploy-e55bebef5123>.
IBM/raksh, "Seamlessly use VM based TEEs with Kubernetes for data-in use protection", Dec. 24, 2019, GitHub.com, 8 pages, 'Grace Period Disclosure', <https://github.com/IBM/raksh>.

* cited by examiner

*Primary Examiner* — Michael S McNally
(74) *Attorney, Agent, or Firm* — Stephanie L. Carusillo

(57) ABSTRACT

In an approach for securing container workloads, a processor encrypts workload binaries. A processor uploads the workload binaries to a software repository. A processor encrypts a workload definition. A processor replaces the workload definition with a mock workload definition. A processor references the encrypted workload definition in the mock workload definition. A processor submits the mock workload definition to a master node.

20 Claims, 6 Drawing Sheets

HARDWARE MEMORY ENCRYPTION AND PROTECTION FOR CONTAINERS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) What You Define is What You Deploy, Pradipta Banerjee and Harshal Patil, 1/27/20, https://medium.com/@pradipta.banerjee/what-you-define-is-what-you-deploy-e55bebef5123

(ii) Seamlessly use VM based TEEs with Kubernetes for data-in use protection, 12/10/20, 12/24/19, https://github.com/IBM/raksh

BACKGROUND

The present invention relates generally to the field of containers, and more particularly to launching container workloads using hardware memory encryption and protection.

Virtual machines (VMs) are servers abstracted from the actual computer hardware, enabling the running of multiple VMs on one physical server or a single VM that spans more than one physical server. Each VM runs its own operating system (OS) instance, and each application can be isolated in its own VM, reducing the chance that applications running on the same underlying physical hardware will impact each other. VMs make better use of resources and are much easier and more cost-effective to scale than traditional infrastructure. VMs are disposable, such that when an application no longer needs to run, the VM van be taken down. Containers take this abstraction to a higher level, specifically, in addition to sharing the underlying virtualized hardware, containers share an underlying, virtualized OS kernel as well. A container is a standard unit of software that packages up code and all its dependencies so that an application runs quickly and reliably from one computing environment to another. Containers isolate software from its environment and ensure that it works uniformly despite differences for instance between development and staging. Containers take advantage of a form of OS virtualization that lets multiple applications share the OS by isolating processes and controlling the amount of CPU, memory, and disk those processes can access.

Containers offer the same isolation, scalability, and disposability of VMs, but because containers don't carry the payload of their own OS instance, containers are lighter weight (take up less space) than VMs. Containers are more resource-efficient by letting you run more applications on fewer machines (virtual and physical), with fewer OS instances. Containers are more easily portable across desktop, data center, and cloud environments. KUBERNETES® is a container orchestration platform for scheduling and automating the deployment, management, and scaling of containerized applications.

SUMMARY

Aspects of an embodiment of the present invention disclose a method, computer program product, and computer system for securing container workloads. A processor encrypts workload binaries. A processor uploads the workload binaries to a software repository. A processor encrypts a workload definition. A processor replaces the workload definition with a mock workload definition. A processor references the encrypted workload definition in the mock workload definition. A processor submits the mock workload definition to a master node.

DETAILED DESCRIPTION

Figure 1:
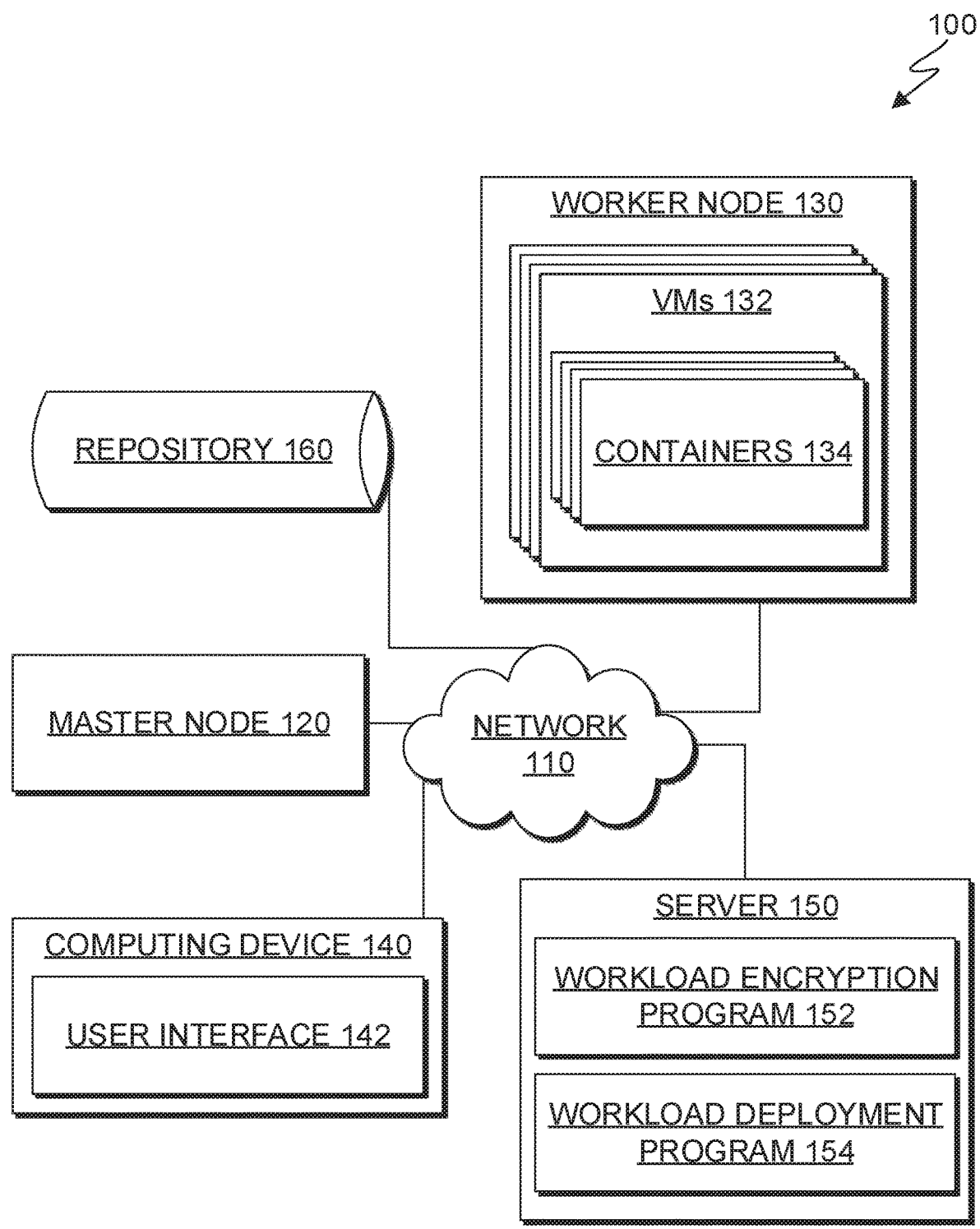
FIG. 1 depicts a block diagram of a distributed data processing environment, in accordance with an embodiment of the present invention.

Embodiments of the present invention recognize that container workloads run in cloud computing environments by completely trusting the cloud providers, but cloud providers can be unsecure and untrustworthy. Embodiments of the present invention further recognize that businesses, i.e., clients of cloud providers, put their trust in cloud providers to not snoop on their data. Embodiments of the present invention remove the need to place this trust on cloud providers by using hardware memory encryption and protection technologies.

A typical workflow for launching container workloads begins by building workload binaries, which are application binaries in the form of a container image. The workload binaries are uploaded to a software repository from where the workload binaries are later served. For deploying a workload binary in a clustered environment, a workload definition is created, in which a workload definition is metadata that contains information to run the workload binaries, such as environmental variables, application arguments, network settings, storage, etc. The workload definition is submitted to the master node of a cluster of worker nodes. The master node uses the submitted workload definition to select a worker node where the workload will be executed. The selected worker node uses the workload definition to fetch the workload binaries from the software repository. Once the worker node fetches the workload binaries, the worker node executes them, and thus, launches the container workload.

In a Kubernetes implementation, a typical workflow begins by building the container image. The container image is uploaded to a container registry from where the container image is later served. A Kubernetes deployment YAML file is created and sent to the Kubernetes master node. The Kubernetes master node uses the created YAML file to select a worker node where the workload will be executed. The selected worker node uses the YAML file to fetch the container image from the container registry. Once the worker node fetches the container image, the worker node runs the container.

Embodiments of the present invention utilize hardware memory encryption and protection technologies to protect memory used by a VM when launching container workloads. Hardware memory encryption and protection technologies provide the ability to securely execute code, i.e., a container workload, within the confines of a secure VM. Using these technologies, the memory pages used by such code are not accessible to the host, and thus provide increased security from unintentional or malicious attempts to read or modify workload execution. Embodiments of the present invention utilize hardware memory encryption and protection technologies to launch VMs securely, and thus, launching container workloads on those secure VMs. Embodiments of the present invention provide a method and system for launching container workloads using protected memory on cluster worker nodes of a secure VM.

Embodiments of the present invention protect container workloads by (1) encrypting workload binaries and the workload definition with encryption keys accessible exclusively to the secure VM taking advantage of the memory encryption and protection hardware of the worker node to protect the workload from the master node (or cluster master) as well as the cluster worker nodes; (2) utilizing a mock workload definition and mock workload binaries during runtime; (3) orchestrating cluster operations using the mock workload definition to conceal workload from cluster master and worker node; (4) decrypting workload definition and workload binaries within the confinement of a secure VM in order to completely conceal the workload execution from the worker node and the cluster; and (5) determining resource requirements for the secure VM and dynamically adjusting the secure VM resources based on the container workload's requirements.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes master node 120, worker node 130, computing device 140, server 150, and repository 160 interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between master node 120, worker node 130, computing device 140, server 150, and repository 160. Distributed data processing environment 100 may include additional nodes, servers, computers, or other devices not shown.

Master node 120 operates as a computing node that controls and manages a set of worker nodes, i.e., worker node 130. In some embodiments, master node 120 may be a management server, a web server, or any other electronic device or computing system capable of receiving and sending data. In some embodiments, master node 120 represents a server computing system utilizing multiple computers as a server system, such as in a cloud computing environment. In an embodiment, master node 120 receives a submitted job to allocate a container workload and selects a worker node to execute and run the container workload. Master node 120 may include components as described in further detail in FIG. 6.

Worker node 130 operates as a computing node for running workloads that is managed by a master node, i.e., master node 120. In the depicted embodiment, worker node 130 houses virtual machines (VMs) 132. In the depicted embodiment, worker node 130 represents the worker node of a cluster of worker nodes selected by master node 120 to run a container workload. In some embodiments, worker node 130 may be a management server, a web server, or any other electronic device or computing system capable of receiving and sending data. In some embodiments, worker node 130 represents a server computing system utilizing multiple computers as a server system, such as in a cloud computing environment. In an embodiment, distributed data processing environment 100 contains a cluster of worker nodes (not shown) for master node 120 to pick from when deploying container workloads. Worker node 130 may include components as described in further detail in FIG. 6.

VMs 132 operate as secure virtual machines for running container workloads, i.e., workloads of containers 134. In some embodiments (not shown), VMs 132 may be housed on separate servers, and/or computing devices acting as a worker node provided that VMs 132 have access to network 110. Containers 134 operates as packaged units of software for running workloads received in jobs submitted to master node 120 and run by VMs 132 on worker node 130. In an embodiment, workloads of containers 134 are encrypted by workload encryption program 152 and deployed within a secure VM, e.g., VMs 132, by workload deployment program 154.

Computing device 140 operates to send and receive data through a user interface. In some embodiments, computing device 140 may be, but is not limited to, an electronic device, such as a laptop computer, a tablet computer, a netbook computer, a personal computer (PC), a desktop computer, a smart phone, or any programmable electronic device capable of running user interface 142 and communicating (i.e., sending and receiving data) with server 150, workload encryption program 152, and/or workload deployment program 154 via network 110. In some embodiments, computing device 140 represents one or more programmable electronic devices or combination of programmable electronic devices capable of executing machine readable program instructions and communicating with server 150 and/or other computing devices within distributed data processing environment 100 via a network, such as network 110. In an embodiment, computing device 140 represents one or more devices associated with a user. In the depicted embodiment, computing device 140 includes an instance of user interface 142. Computing device 140 may include components as described in further detail in FIG. 6.

User interface 142 operates as a local user interface on computing device 140 through which a user can build workload binaries, encrypt workload binaries, and/or submit a job. In some embodiments, user interface 142 is a graphical user interface (GUI), a web user interface (WUI), and/or a voice user interface (VUI) that can display (i.e., visually) or present (i.e., audibly) information (such as graphics, text, and/or sound) sent via network 110 to a user of computing device 140. In an embodiment, user interface 142 enables a user to send and receive data via network 110, i.e., to and from workload encryption program 152, respectively.

Server 150 operates to operates to run workload encryption program 152 and workload deployment program 154. In an embodiment, server 150 can send data from database 154 to worker node 130 and/or computing device 140. In an embodiment, server 150 can receive data in database 154 from worker node 130 and/or computing device 140. In some embodiments, server 150 may be a management server, a web server, or any other electronic device or computing system capable of receiving and sending data. In some embodiments, server 150 may be a laptop computer, tablet computer, netbook computer, personal computer (PC), a desktop computer, a smart phone, or any programmable electronic device capable of communicating with worker node 130 and/or computing device 140 via network 110. In other embodiments, server 150 represents a server computing system utilizing multiple computers as a server system, such as in a cloud computing environment. Server 150 may include components as described in further detail in FIG. 6.

Workload encryption program 152 operates to secure container workloads using protected and encrypted memory hardware. In the depicted embodiment, workload encryption program 152 resides on server 150. In other embodiments, workload encryption program 152 may reside on another computing device (not shown), provided that workload encryption program 152 has access to network 110. Workload encryption program 152 is discussed in more detail below with reference to FIG. 2.

Workload deployment program 154 operates to deploy the secure container workloads using protected and encrypted memory hardware of a secure VM. In the depicted embodiment, workload deployment program 154 resides on server 150. In other embodiments, workload deployment program 154 may reside on another computing device (not shown), provided that workload deployment program 154 has access to network 110. Workload deployment program 154 is discussed in more detail below with reference to FIG. 3

Repository 160 operates as a software repository for data received, used, and/or output by workload encryption program 152 and/or workload deployment program 154. Data received, used, and/or generated by workload encryption program 152 and/or workload deployment program 154 may include, but is not limited to, workload binaries, encrypted workload binaries, workload definitions, and/or encrypted workload definitions. Repository 160 can be implemented with any type of storage device capable of storing workload binaries and/or encrypted workload binaries, such as a database server, a hard disk drive, or a flash memory. In an embodiment, repository 160 is accessed by workload encryption program 152, via network 110, to store and/or to access data. In an embodiment, repository 160 is accessed by workload deployment program 154, via network 110, to store and/or to access data. In an embodiment, repository 160 resides on a server or computing device, provided that repository 160 has access to network 110.

Figure 2:
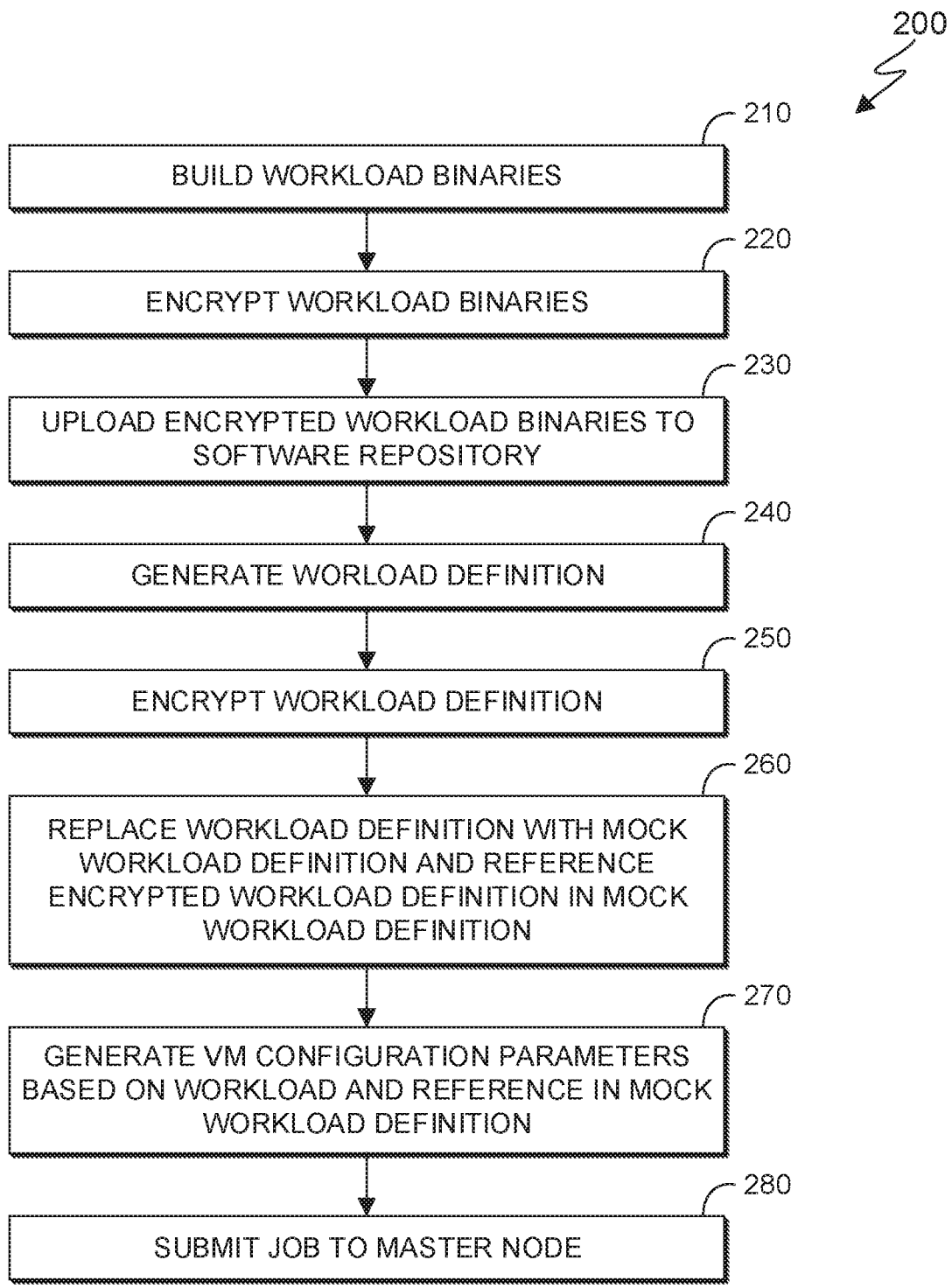
FIG. 2 depicts a flowchart of the steps of a workload encryption program, in accordance with an embodiment of the present invention.

FIG. 2 depicts a flowchart 200 of the steps of workload encryption program 152, in accordance with an embodiment of the present invention. In an embodiment, workload encryption program 152 builds workload binaries, encrypts the workload binaries, and uploads the workload binaries to a software repository. In an embodiment, workload encryption program 152 generates a workload definition, encrypts the workload definition, replaces the workload definition with a mock workload definition, references the encrypted workload definition in the mock workload definition, generates a set of VM configuration parameters based on workload's requirements and references the parameters in the mock workload definition, and submits a job to master node. It should be appreciated that the process depicted in FIG. 2 illustrates one possible iteration of the process flow for workload encryption program 152, which can be repeated.

In step 210, workload encryption program 152 builds workload binaries. In an embodiment, workload encryption program 152 builds workload binaries for a container workload. Workload binaries are application binaries in the form of a container image. In an embodiment, workload encryption program 152 enables a user, through user interface 142, to build workload binaries for a container workload.

In step 220, workload encryption program 142 encrypts the workload binaries. In an embodiment, workload encryption program 142 encrypts the workload binaries. In an embodiment, workload encryption program 142 encrypts the workload binaries with encryption keys accessible exclusively to the secure VM, e.g., VM 132. In an embodiment, workload encryption program 142 encrypts the workload binaries using hardware memory encryption and protection technologies. In an embodiment, workload encryption program 142 encrypts the workload binaries using standard encryption techniques known to a person of skill in the art. In an embodiment, workload encryption program 152 enables a user, through user interface 142, to encrypt the workload binaries.

In step 230, workload encryption program 142 uploads the workload binaries to a software repository. In an embodiment, workload encryption program 142 uploads the encrypted workload binaries to repository 160.

In step 240, workload encryption program 142 generates a workload definition. In an embodiment, workload encryption program 142 generates a workload definition for the container workload. A workload definition is metadata that contains information to run the workload binaries, such as environmental variables, application arguments, network settings, storage, etc.

In step 250, workload encryption program 142 encrypts the workload definition. In an embodiment, workload encryption program 142 encrypts the workload definition. In an embodiment, workload encryption program 142 encrypts the workload definition with the same encryption keys used to encrypt the workload binaries. In an embodiment, workload encryption program 142 encrypts the workload definition using standard encryption techniques known to a person of skill in the art. In an embodiment, workload encryption program 152 enables a user, through user interface 142, to encrypt the workload definition.

In step 260, workload encryption program 142 replaces the workload definition with a mock workload definition. In an embodiment, workload encryption program 142 replaces the encrypted workload definition with a mock workload definition that includes reference to mock workload binaries. The mock workload definition and mock workload binaries are stand ins or temporary executable binaries. In an embodiment, workload encryption program 142 references the encrypted workload definition in the mock workload definition.

In step 270, workload encryption program 142 generates a set of VM configuration parameters based on workload's requirement and references the parameters in the mock workload definition. In an embodiment, workload encryption program 142 generates a set of VM configuration parameters based on the workload's requirements. The set of VM configuration parameters may include, but is not limited to, memory, CPU, network related parameters, etc. In an embodiment, workload encryption program 152 enables a user, through user interface 142, to define the workload's requirements. In an embodiment, workload encryption program 142 references the set of VM configuration parameters in the mock workload definition.

In step 280, workload encryption program 142 submits a job to master node. In an embodiment, workload encryption program 142 submits a job to master node, e.g., master node 120. A job includes one or more containers and the workload definition for the one or more containers. In an embodiment, workload encryption program 152 enables a user, through user interface 142, to submit a job to the master node, e.g., master node 120.

Figure 3:
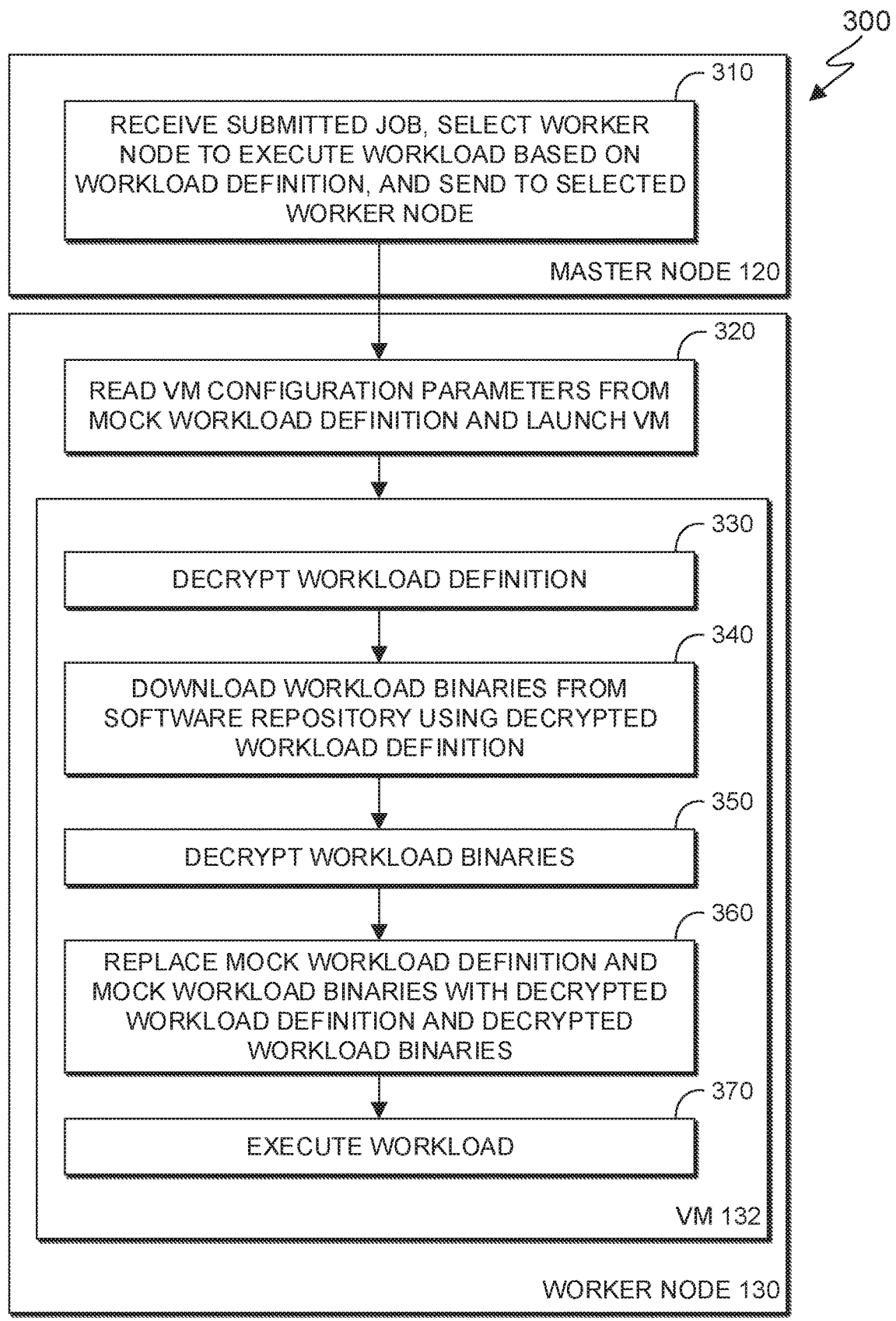
FIG. 3 depicts a workflow of how an encrypted container workload is deployed and executed on a worker node within a secure VM utilizing a workload deployment program, in accordance with an embodiment of the present invention.

FIG. 3 depicts a workflow 300 of how an encrypted container workload is deployed and executed on a worker node within a secure VM utilizing workload deployment program 154, in accordance with an embodiment of the present invention. It should be appreciated that the process depicted in FIG. 3 illustrates one possible iteration of workflow 300, which can be repeated.

In step 310, within master node 120, workload deployment program 154 receives the submitted job, selects a worker node to execute the workload based on the mock workload definition in the submitted job, and sends the job to the selected worker node, e.g., worker node 130. In step 320, within worker node 130, workload deployment program 154 reads the VM configuration parameters from the mock workload definition and launches a secure VM, e.g., VM 132, with the VM configuration parameters. In step 330, within VM 132, workload deployment program 154 decrypts the workload definition using the encryption keys accessible exclusively to VM 132. In step 340, within VM 132, workload deployment program 154 downloads the encrypted workload binaries from the software repository using the decrypted workload definition. In step 350, within VM 132, workload deployment program 154 decrypts the workload binaries using the encryption keys accessible exclusively to VM 132. In step 360, within the secure VM, workload deployment program 154 replaces the mock workload definition and mock workload binaries with decrypted workload definition and decrypted workload binaries. In step 370, within the secure VM, workload deployment program 154 executes the workload.

Figure 4:
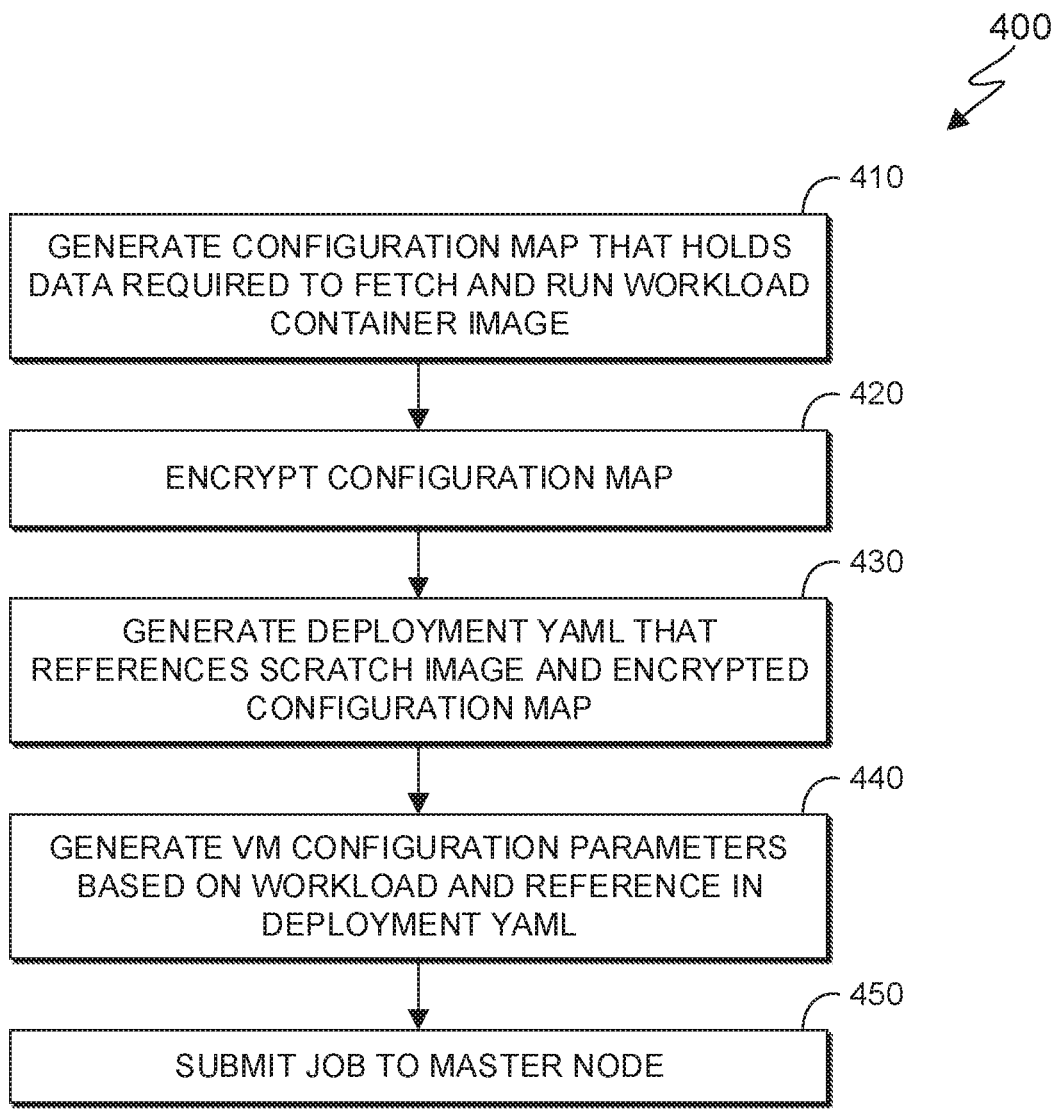
FIG. 4 depicts a flowchart of the steps of a specific embodiment of workload encryption program, in accordance with an embodiment of the present invention.

FIG. 4 depicts a flowchart 400 of the steps of workload encryption program 142 within a Kubernetes environment, in accordance with an embodiment of the present invention. In an embodiment, workload encryption program 142 generates a configuration map that holds data required to fetch and run a workload container image. In an embodiment, workload encryption program 142 encrypts the configuration map. In an embodiment, workload encryption program 142 generates a deployment YAML file that references a scratch image and the encrypted configuration map. In an embodiment, workload encryption program 142 generates a set of VM configuration parameters based on workload's requirements and references the parameters in the deployment YAML file. In an embodiment, workload encryption program 142 submits a job to master node.

Figure 5:
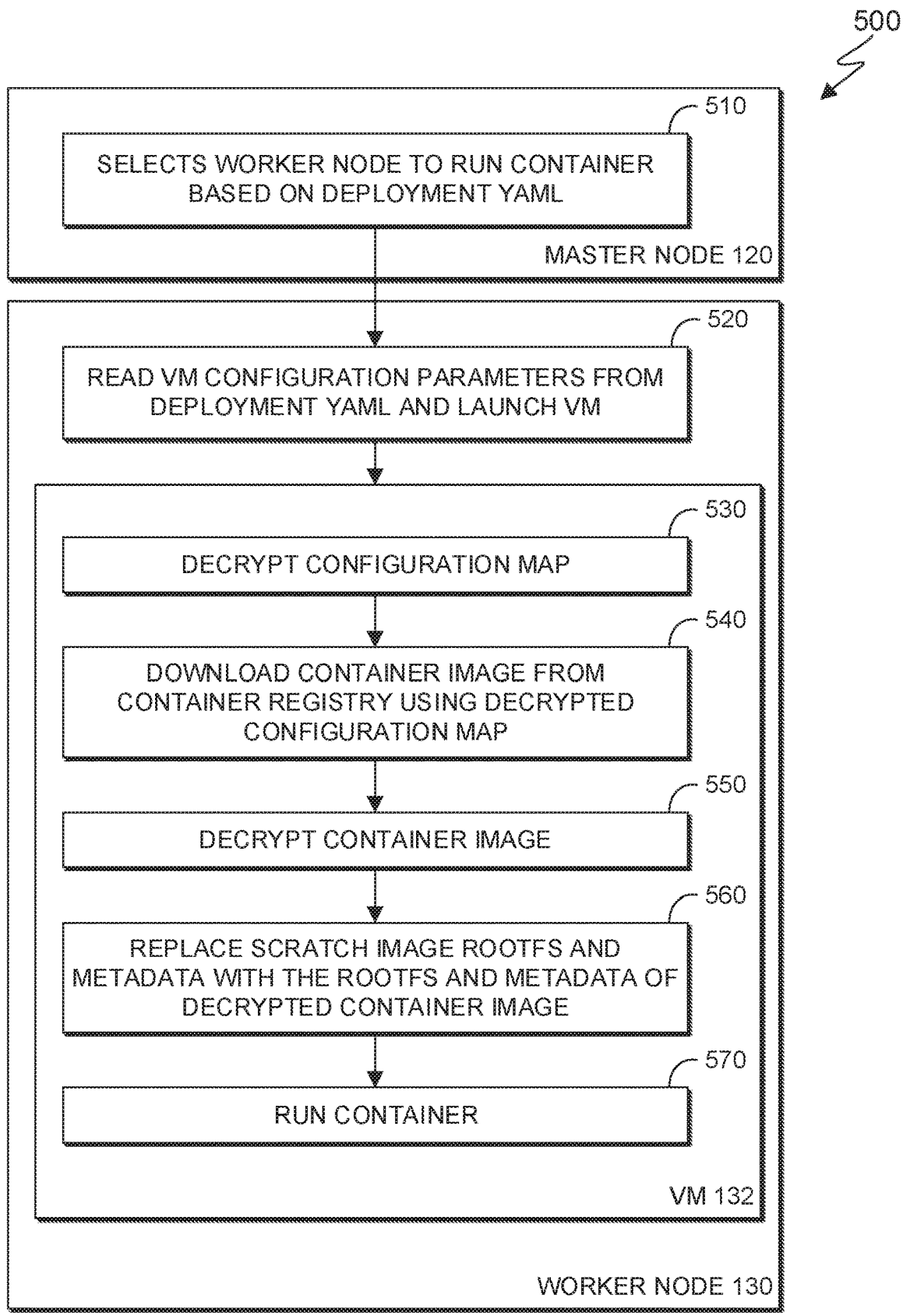
FIG. 5 depicts a workflow of the steps of a specific embodiment of FIG. 3, in accordance with an embodiment of the present invention.

FIG. 5 depict a workflow 500 showing the Kubernetes specific implementation of FIG. 3, in accordance with an embodiment of the present invention. In an embodiment, the master node receives the submitted job, selects a worker node to run container workload based on the deployment YAML file, and sends the job to the selected worker node. In an embodiment, the selected worker node reads the VM configuration parameters from the deployment YAML file and launches a secure VM. In an embodiment, the VM decrypts the configuration map, downloads the container image from container registry using the decrypted configuration map, decrypts the container image, replaces the scratch image root file system (rootfs) and metadata with the rootfs and metadata of the decrypted container image, and run the container workload. Rootfs is the filesystem used to run the container workload.

Figure 6:
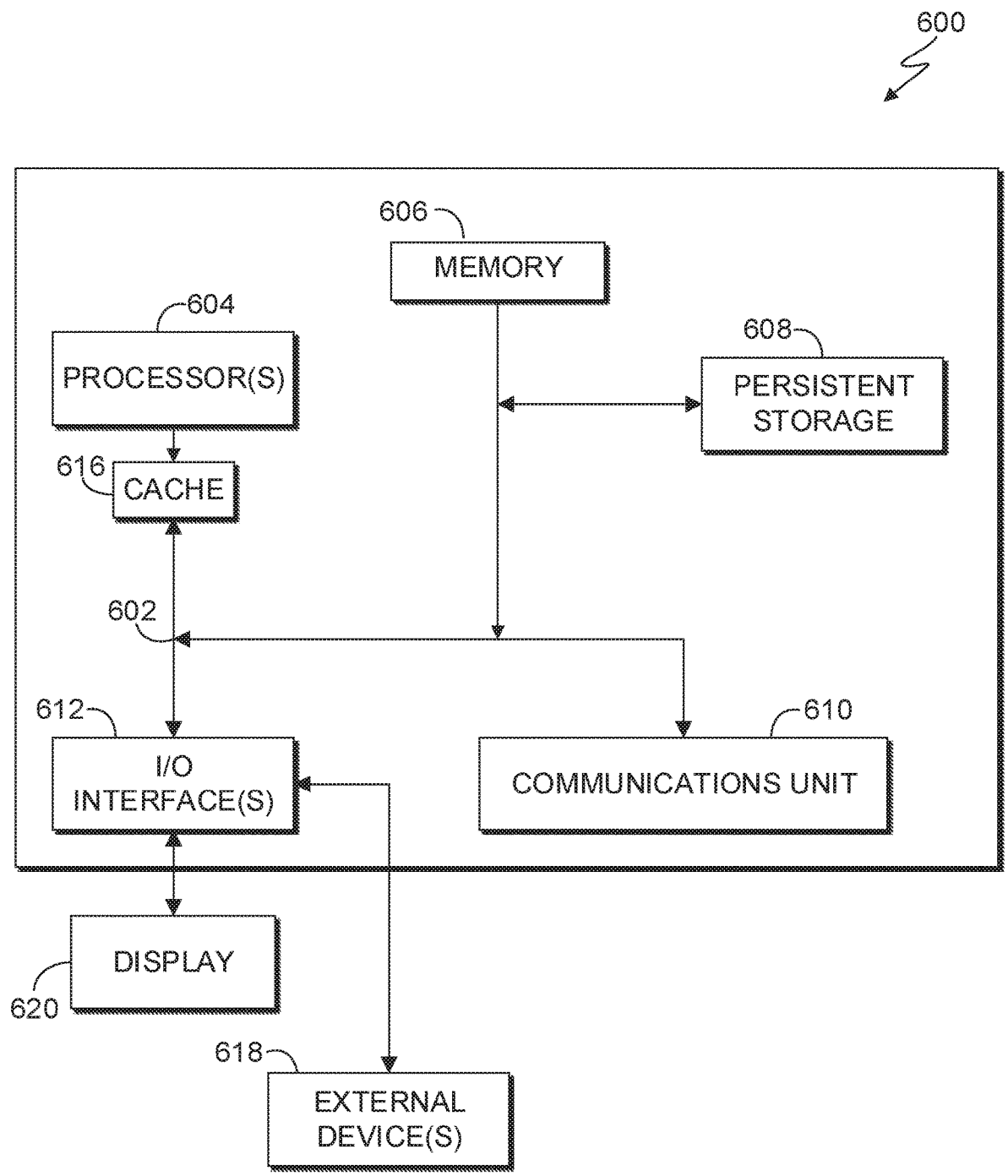
FIG. 6 depicts a block diagram of a computer of distributed data processing environment, in accordance with an embodiment of the present invention.

FIG. 6 depicts a block diagram of computer 600 suitable for master node 120, worker node 130, computing device 140, and/or server 150, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs may be downloaded to persistent storage 608 through communications unit 610.

I/O interface(s) 612 allows for input and output of data with other devices that may be connected to server 120. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for securing container workloads, the computer-implemented method comprising:
   encrypting, by one or more processors, workload binaries of a workload;
   uploading, by the one or more processors, the workload binaries to a software repository;
   encrypting, by the one or more processors, a workload definition;
   replacing, by the one or more processors, the workload definition with a mock workload definition;
   referencing, by the one or more processors, the encrypted workload definition in the mock workload definition; and
   submitting, by the one or more processors, the mock workload definition to a master node.

2. The computer-implemented method of claim 1, further comprising:
   building, by the one or more processors, the workload binaries of the workload.

3. The computer-implemented method of claim 1, further comprising:
   generating, by the one or more processors, the workload definition.

4. The computer-implemented method of claim 1, further comprising:
   generating, by the one or more processors, a set of virtual machine configuration parameters based on requirements of the workload; and
   referencing, by the one or more processors, the set of virtual machine configuration parameters in the mock workload definition.

5. The computer-implemented method of claim 1, wherein the workload binaries and the workload definition are encrypted with encryption keys accessible exclusively to a secure virtual machine.

6. The computer-implemented method of claim 4, wherein the requirements of the workload are defined by a user through a user interface on a computing device.

7. The computer-implemented method of claim 4, further comprising:
   responsive to the master node selecting a worker node for the workload based on the set of virtual machine configuration parameters in the mock workload definition, launching, by the one or more processors, a secure virtual machine within the worker node;
   decrypting, by the one or more processors, within the secure virtual machine, the workload definition;
   downloading, by the one or more processors, within the secure virtual machine, the workload binaries from the software repository using the decrypted workload definition;
   decrypting, by the one or more processors, within the secure virtual machine, the workload binaries;
   replacing, by the one or more processors, within the secure virtual machine, the mock workload definition and mock workload binaries with the decrypted workload definition and decrypted workload binaries; and
   executing, by the one or more processors, within the secure virtual machine, the workload.

8. A computer program product for securing container workloads, the computer program product comprising:
   one or more computer readable storage media and program instructions stored on the one or more computer readable storage media, the program instructions comprising:
   program instructions to encrypt workload binaries for a workload;
   program instructions to upload the workload binaries to a software repository;
   program instructions to encrypt a workload definition;
   program instructions to replace the workload definition with a mock workload definition;
   program instructions to reference the encrypted workload definition in the mock workload definition; and
   program instructions to submit the mock workload definition to a master node.

9. The computer program product of claim 8, further comprising:
   program instructions to build the workload binaries of the workload.

10. The computer program product of claim 8, further comprising:
    program instructions to generate the workload definition.

11. The computer program product of claim 8, further comprising:
    program instructions to generate a set of virtual machine configuration parameters based on requirements of the workload; and
    program instructions to reference the set of virtual machine configuration parameters in the mock workload definition.

12. The computer program product of claim 8, wherein the workload binaries and the workload definition are encrypted with encryption keys accessible exclusively to a secure virtual machine.

13. The computer program product of claim 11, wherein the requirements of the workload are defined by a user through a user interface on a computing device.

14. The computer program product of claim 11, further comprising:
    responsive to the master node selecting a worker node for the workload based on the set of virtual machine configuration parameters in the mock workload definition, program instructions to launch a secure virtual machine within the worker node;
    program instructions to decrypt, within the secure virtual machine, the workload definition;

program instructions to download, within the secure virtual machine, the workload binaries from the software repository using the decrypted workload definition;

program instructions to decrypt, within the secure virtual machine, the workload binaries;

program instructions to replace, within the secure virtual machine, the mock workload definition and mock workload binaries with the decrypted workload definition and decrypted workload binaries; and program instructions to execute, within the secure virtual machine, the workload.

15. A computer system for securing container workloads, the computer system comprising:

one or more computer processors;

one or more computer readable storage media;

program instructions stored on the computer readable storage media for execution by at least one of the one or more processors, the program instructions comprising:

program instructions to encrypt workload binaries for a workload;

program instructions to upload the workload binaries to a software repository;

program instructions to encrypt a workload definition;

program instructions to replace the workload definition with a mock workload definition;

program instructions to reference the encrypted workload definition in the mock workload definition; and program instructions to submit the mock workload definition to a master node.

16. The computer system of claim 15, further comprising: program instructions to build the workload binaries of the workload.

17. The computer system of claim 15, further comprising: program instructions to generate the workload definition.

18. The computer system of claim 15, further comprising:

program instructions to generate a set of virtual machine configuration parameters based on requirements of the workload; and program instructions to reference the set of virtual machine configuration parameters in the mock workload definition.

19. The computer system of claim 15, wherein the workload binaries and the workload definition are encrypted with encryption keys accessible exclusively to a secure virtual machine.

20. The computer system of claim 18, further comprising:

responsive to the master node selecting a worker node for the workload based on the set of virtual machine configuration parameters in the mock workload definition, program instructions to launch a secure virtual machine within the worker node;

program instructions to decrypt, within the secure virtual machine, the workload definition;

program instructions to download, within the secure virtual machine, the workload binaries from the software repository using the decrypted workload definition;

program instructions to decrypt, within the secure virtual machine, the workload binaries;

program instructions to replace, within the secure virtual machine, the mock workload definition and mock workload binaries with the decrypted workload definition and decrypted workload binaries; and program instructions to execute, within the secure virtual machine, the workload.

* * * * *